(12) United States Patent
Sceats et al.

(10) Patent No.: US 8,449,853 B2
(45) Date of Patent: May 28, 2013

(54) METHOD AND SYSTEM FOR EXTRACTING CARBON DIOXIDE FROM AN INDUSTRIAL SOURCE OF FLUE GAS AT ATMOSPHERIC PRESSURE

(75) Inventors: Mark Geoffrey Sceats, Pyrmont (AU); Julian Westley Dinsdale, Mount Kuring-gai (AU)

(73) Assignee: Calix Limited, Pymble, New South Wales (AU)

( * ) Notice: Subject to any disclaimer, the term of this patent is extended or adjusted under 35 U.S.C. 154(b) by 0 days.

(21) Appl. No.: 13/386,378

(22) PCT Filed: Jul. 20, 2010

(86) PCT No.: PCT/AU2010/000921
§ 371 (c)(1),
(2), (4) Date: May 7, 2012

(87) PCT Pub. No.: WO2011/009163
PCT Pub. Date: Jan. 27, 2011

(65) Prior Publication Data
US 2012/0219481 A1    Aug. 30, 2012

(30) Foreign Application Priority Data

Jul. 20, 2009   (AU) ............................. 2009903389

(51) Int. Cl.
*B01D 53/62* (2006.01)
*B01D 53/74* (2006.01)
*B01D 53/75* (2006.01)

(52) U.S. Cl.
USPC ............ 423/220; 422/168; 422/169; 422/187

(58) Field of Classification Search
USPC ........................... 423/220; 422/168, 169, 187
See application file for complete search history.

(56) References Cited

U.S. PATENT DOCUMENTS

| 4,977,745 A | 12/1990 | Heichberger |
| 2008/0127632 A1 | 6/2008 | Finkenrath et al. |
| 2012/0219481 A1* | 8/2012 | Sceats et al. .................. 423/220 |

FOREIGN PATENT DOCUMENTS

WO    WO 2008-099291 A2    8/2008

OTHER PUBLICATIONS

Lin et al., "Process Analysis for Hydrogen Production by Reaction Integrated Novel Gasification (HyPr-RING);" Energy Conversion & Management, vol. 46, Issue 6, 2005, pp. 869-880.
The International Preliminary Report on Patentability and Written Opinion of the International Searching Authority for Application No. PCT/AU2010/000921, mailed on Aug. 16, 2010, 4 pages.
International Search Report of the International Searching Authority for Application No. PCT/AU2010/000921, mailed on Aug. 16, 2010, 2 pages.

* cited by examiner

*Primary Examiner* — Timothy Vanoy
(74) *Attorney, Agent, or Firm* — Kilpatrick Townsend & Stockton LLP

(57) ABSTRACT

A system and method for extracting carbon dioxide from an industrial source of flue gas at atmospheric pressure. The system comprises means for conditioning the flue gas for entry into a compressor unit; the compressor unit being adapted compressing the conditioned flue gas; a heater unit for heating the compressed flue gas; an expander unit for expanding the heated compressed flue gas for generating power; and a separator unit for separating Carbon Dioxide from the heated compressed flue gas.

14 Claims, 4 Drawing Sheets

METHOD AND SYSTEM FOR EXTRACTING CARBON DIOXIDE FROM AN INDUSTRIAL SOURCE OF FLUE GAS AT ATMOSPHERIC PRESSURE

CROSS-REFERENCE TO RELATED APPLICATION

This application is a National Stage of International Application No. PCT/AU2010/000921, filed Jul. 20, 2010, which claims the benefit of priority to Australian Application No. 2009903389, filed Jul. 20, 2009, the disclosures of which are herein incorporated by reference.

FIELD OF INVENTION

The present invention relates broadly to a method and system for extracting carbon dioxide from an industrial source of flue gas at atmospheric pressure.

BACKGROUND

There is a need for processes that can capture CO2 from the flue gases emitted from a variety of industrial processes e.g. from power, cement, lime, iron & steel, petroleum processing, in order to mitigate global warming from the CO2 emissions from such installations. The separation of CO2 from combustion gases is the first step in a Carbon Capture and Sequestration (CCS) process in which the CO2 is separated, compressed to a high density fluid, transported and sequestered in deep saline aquifers, depleted oil and gas fields, deep coal seams, or deep ocean reservoirs. Because of the very large investment associated with industrial infrastructure in the industrial processes, it is preferable that the separation process can be retrofitted to capture the flue gases emitted from such existing infrastructure, in a process referred to as Post Combustion Capture (PCC).

While there are many existing chemical and physical processes for separating CO2 from flue and fuel gases, the barriers to widespread adoption of any such process are technical, economic and environmental. For power plants, a viable PCC CCS process is typically expected to meet the following specifications:

- The cost of CO2 separation, including compression to the high density fluid, is low, e.g. less than US$20 tonne-1; and
- The efficiency of capture of CO2 from the flue gas is high, e.g. exceeds 90%; and
- The efficiency of production of electricity (Electrical Power Output to Lower Heat Value of the Fuel) is reduced as little as possible, and preferably not more than 5%; and
- There is little or no additional environmental harm.

Sceats ("System and Method for Processing Flue Gas" PCT/AU2009/000613) describes a CaO Looping system, herein called the Endex Configuration, which can meet these specifications. The conventional approach to CO2 separation by CaO Looping was described by Heesink et al (A. B. M. Heesink and H. M. G. Temmink "Process for removing carbon dioxide regeneratively from gas streams" PCT WO 1994/01203) in 1994 for removing CO2 from flue gas and fuel gas streams. The Endex Configuration overcomes the major hurdles in the application of CaO Looping identified in a large body of scientific work since 1994.

Use of a gas turbine power train to provide compressed flue gas to a CO2 separation system before expansion to atmospheric pressure is described by T. Christensen, K. Borseth and H. Fleishner, "Method and Plant for Separation of CO2 from the exhaust from combustion of carbonaceous materials" WO 2004/02645). The principal teaching of that patent application was to describe a means of cooling the hot compressed flue gas so that a low temperature CO2 separation can be used, and reheating the scrubbed compressed flue gas so that the compression, energy can be released in a turboexpander to generate a net output of electrical power. The cooling and reheating will be associated with an energy penalty, and is potentially useful for a number of high pressures, low temperature CO2 separation technologies. However, the described process is not suitable for high pressure, high temperature CO2 separation technologies such as the Endex Configuration.

The insertion of a CO2 Separation System between the stages of a multistage turboexpander in a gas turbine power plant has been described by S. M-N Hoffman and M. Bartlett, "Systems and Methods for Power Generation with Carbon Dioxide Isolation", US Pat Appl. 2008/0104939. However, the separation of CO2 in the power plant as described by US Pat Appl. 2008/0104939 is generally not effective because gas turbine plants have a very low CO2 partial pressure such that the efficiency of CO2 capture even at the high pressures available between the turboexpander segments makes the achievement of high (e.g. 90%) capture target difficult to achieve.

A need therefore exists to provide a system and method to remove CO2 from atmospheric flue gas streams that seeks to address at least one of the above mentioned problems.

SUMMARY

In accordance with a first aspect of the present invention there is provided a system for extracting carbon dioxide from an industrial source of flue gas at atmospheric pressure, the system comprising means for conditioning the flue gas for entry into a compressor unit; the compressor unit being adapted compressing the conditioned flue gas; a heater unit for heating the compressed flue gas; an expander unit for expanding the heated compressed flue gas for generating power; and a separator unit for separating Carbon Dioxide from the heated compressed flue gas.

The expander unit may comprise two more expander elements configured in an expander train, and the separator unit is disposed between successive ones of the expander elements.

The heater unit may comprise an atmospheric combustion element fueled by a fuel medium and air and a heat transfer unit for transferring heat from the atmospheric combustion element to at least a first portion of the compressed flue gas.

The flue medium may comprise a one or more of a group consisting of a solid, a liquid or a gas.

The system may further comprise means for providing an oxidant in at least a second portion of the compressed flue gas, and the heater unit comprises a high pressure combustor element adapted for injection of a fuel gas for internal combustion of a mixture of the second portion of the compressed flue gas and the fuel gas.

The system may further comprise one or more heat recovery steam generators coupled to one or more steam turbines.

The compressor unit may be adapted to compress the conditioned flue gas to a pressure of 20-30 bar and the heater unit is adapted to heat the compressed flue gas to a temperature in the range of 1250-1350 C.

In accordance with a second aspect of the present invention there is provided a method for extracting carbon dioxide from an industrial source of flue gas at atmospheric pressure, the method comprising the steps of conditioning the flue gas for entry into a compressor unit; compressing the conditioned flue gas; heating the compressed flue gas; expanding the heated compressed flue gas for generating power; and separating Carbon Dioxide from the heated compressed flue gas.

The expanding step may utilize two more expander elements configured in an expander train, and the separation step utilizes a separator unit disposed between successive ones of the expander elements.

The heating step may utilize an atmospheric combustion element fueled by a fuel medium and air and a heat transfer unit for transferring heat from the atmospheric combustion element to at least a first portion of the compressed flue gas.

The flue medium may comprise a one or more of a group consisting of a solid, a liquid or a gas.

The method may further comprise providing an oxidant in at least a second portion of the compressed flue gas, and injecting of a fuel gas for internal combustion of a mixture of the second portion of the compressed flue gas and the fuel gas.

The method may further comprise generating energy utilizing one or more recovery steam generators coupled to one or more steam turbines.

The compressing step may compress the conditioned flue gas to a pressure of 20-30 bar and the heating step heats the compressed flue gas to a temperature in the range of 1250-1350 C.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
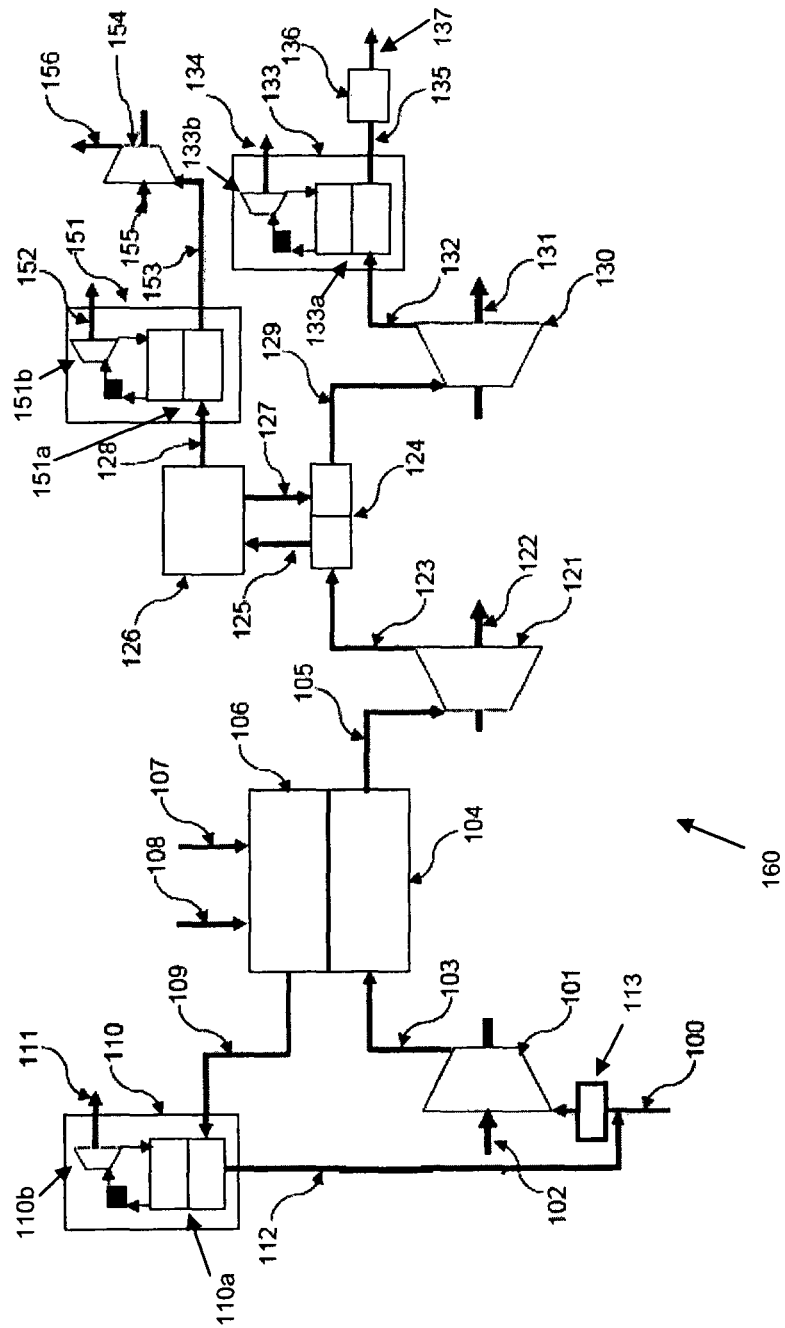
FIG. 1 shows a schematic drawing illustrating the process flow and reactor system for a PCC system according to a first example embodiment in which the combustion of fuel is used to externally heat the flue gas.

The described example embodiments provide a PCC system which extracts $CO_2$ from the atmospheric flue gas from an industrial plant by injecting the flue gas into a gas turbine system which is adapted for $CO_2$ separation. Advantageously, the heated compressed flue gas can generate electrical power when the scrubbed flue gas is expanded back to atmospheric pressure for release to the atmosphere, and this power generation is the mechanism whereby the energy penalties for compression of the flue gas and the $CO_2$ can be ameliorated. The example embodiments can be applied to any high temperature and high pressure separation process, of which CaO Looping is an example. These processes are associated with the formation and breaking of strong chemical bonds with $CO_2$ (as in the formation of carbonates), and therefore have a very high specificity to $CO_2$ compared to the nitrogen and oxygen in the flue gas.

The use of gas turbine technology in the PCC process of the example embodiments can have the benefit of a low capital cost. The use of natural gas for internal combustion in one embodiment may not be preferred in places that have limited access to natural gas. Therefore, an alternative embodiment allows the use of other fuels for the combustion. For example, the cement industry process uses a wide variety of fuels that are locally available, and it is beneficial to use such fuels to drive the PCC process in alternative embodiments described herein. Thus the combustor used to heat the flue gas may be either externally heated by an atmospheric combustion system, or internally heated in a high pressure combustion system, or a combination of both, in different embodiments. In the first case, the energy in the additional flue gas from the combustor can be extracted through a heat recovery steam generator, and the cooled flue gas is injected into the input industrial flue gas stream so that its $CO_2$ is captured. In the second case, air can be injected with the industrial flue gas before the compressor and adds directly to the gas introduced into the $CO_2$ separator.

For a given flue gas, the CaO Looping system in example embodiments operates most efficiently at a specified temperature and pressure. For example, for the Endex Configuration, the temperature and partial pressure of the $CO_2$ in the flue gas preferably are about 780-820 C and about 1.5-2.5 bar respectively. On the other hand, the efficiency of power generation is most efficient at a high temperature and pressure. Therefore, it is advantageous to place the $CO_2$ separator between expansion stages of the turboexpander, so that additional power is generated from the earlier stages of the expansion. If the system operates prior to the first stage, the temperature of the input is limited to 780-820 C, and the PCC system may not generate electrical power as efficiently as if the first stage was heated to e.g. at 1300 C for the first stage expansion.

Electrical power is preferably generated by a combined cycle of the turboexpander and a steam cycle. This electrical power drives the flue gas compressor and the $CO_2$ compressor as required for sequestration, with the excess power being applied to the industrial process and/or the power grid. The efficiency of the overall process depends on the efficiency of separation of the $CO_2$ from the flue gas, and if this is high, then the energy penalty is preferably small and most of the thermal power from the combustor is preferably available to generate electrical power.

FIG. 1 shows a schematic drawing illustrating a system and flow process according to one example embodiment of a PCC reactor 160. The flue gas 100 from an industrial process (not shown) is subjected to a scrubbing process 113 to remove chemicals and particulates required to meet emissions standards and the specifications for the compressors and expanders described below. For example, the flue gas 100 is preferably scrubbed of sulphur and mercury for emissions standard and volatile heavy metal compounds such as vanadium that corrode steel in turbo expanders. The scrubbed flue gas 100 is compressed in a compressor 101 with a power input 102 to give an output compressed gas 103 in the range of 20-30 bar. The compressor 101 preferably operates adiabatically to maximise the temperature of the compressed gas 103. This gas 103 is heated in a heat exchanger 104 to a heated compressed flue gas 105 with a temperature preferably in the range of about 1250-1350 C and a pressure in the range of 20-30 bar. These are typical exhaust gas temperatures of gas turbine plants, as will be understood by a person skilled in the art.

The heater unit that provides the heat is, in this embodiment, an atmospheric combustor 106 in which fuel 107 is combusted in air 108 at about 1 bar pressure. The fuel 107 may be a solid, such as coal, lignite or biomass, or a liquid such as oil or biofuel, or a gas such as natural gas or syngas. The exhaust gas 109 from the combustor 106 would be a high temperature exhaust at about 1250-1350 C. The design of the combustor 106 preferably makes allowance for the high pressure differential and the need to transfer heat efficiently across the heat exchange 104 at high temperatures. The residual heat in the exhaust gas 109 can be extracted by a first steam turbine system 110 through a Heat Recovery Steam Generator (HRSG) 110a, which produces electrical power 111 from a turbine/turbine train 110b and which provides a low temperature atmospheric flue gas 112 which can be treated in the scrubber 113 (or a separate scrubber) to meet the same specifications as the industrial flue gas 100 for injection into the system.

The hot compressed flue gas 105 from the heat exchanger 104 is expanded through one or more stages of a turboexpander 121 that generates electrical power 122 and produces a flue gas 123 that has a lower pressure and temperature compared to the hot compressed flue gas 105 due to the adiabatic expansion. The pressure of the flue gas 123 is advantageously matched to the CO2 separation process. The flue gas 123 enters a heat exchanger 124 where the output flue gas 125 is matched to the CO2 separation process at the pressure of the expansion stage. The heat exchanger 124 is provided in an example embodiment for fine tuning the temperature of the flue gas 125, because the temperature of the flue gas 123 is otherwise fixed once the pressure specified during operation. It is noted that in other embodiments, the heat exchanger 124 may advantageously not be required. The conditioned flue gas 125 is scrubbed of CO2 in the CO2 separator 126 to give a scrubbed flue gas 127 and a hot CO2 stream 128. The temperature and pressure of these output gas streams depend on the CO2 separation system. For example, if the Endex Configuration is used in this example embodiment, the scrubbed flue gas 127 has a small temperature rise from the effect of sorbent heating by the sorption reaction and a small pressure drop due to the pneumatic transport of the sorbent in the separator 126 and the CO2 gas stream is exhausted from the separator 126 at a low CO2 pressure and a lower temperature. For a description of the process flow and system for CO2 separator 126 when implemented in this example embodiment as an Endex Configuration, reference is made to published PCT application no. PCT/AU2009/000613, the contents of which are hereby incorporated by cross reference.

The scrubbed flue gas 127 is reheated in the heat exchanger 124 and the reheated gas 129 is expanded in one or more stages of the turboexpander 130 to a pressure of 1 bar to produce electrical power 131. The energy in the hot flue gas 132 is extracted by a second steam turbine system 133 and heat recovery steam generator 133a to produce electrical power 134 from turbine/turbine train 133b and a cooled scrubbed flue gas 137 which is vented to atmosphere after scrubbing 136 to remove any particles or chemicals from the flue gas 135. In the case of the Endex Configuration this can be a baghouse 136. The energy in the CO2 gas stream 128 from the separator 126 is extracted by a third steam turbine system 151 and heat recovery steam generator 151a that produces electrical power 152 from turbine/turbine train 151b and a cooled gas steam 153 that is compressed in a compressor train 154 to produce the compressed CO2 156 for transport and sequestration.

The output electrical power of the PCC, system in FIG. 1 is given by $$P_{PCC} = P_{exp1} + P_{exp2} + P_{hrsg1} + P_{hrsg2} + P_{hrsg3} - P_{comp} - P_{CO2\,comp}$$

where $P_{exp1}$ and $P_{exp2}$ are the outputs 122 and 131 of the turboexpander 121 and 130 respectively, $P_{hrsg1}$, $P_{hrsg2}$, $P_{hrsg3}$ are the outputs 111, 134, and 152 of the first, second and third steam turbines respectively, and the inputs to the flue gas compressor 101 and CO2 compressors 155 are $P_{comp}$ and $P_{CO2\,comp}$ respectively.

The CO2 emissions from the flue gas output 137 is given by $$\gamma_{C,e} = \zeta(\gamma_{C,I} + \gamma_{C,PCC})$$

where $\zeta$ is the capture efficiency, $\gamma_{C,I}$ is the CO2 emission from the industrial plant and $\gamma_{C,PCC}$ is the CO2 emission from the combustion of fuel in combustor 106. For the application to CO2 capture from an electrical power plant, an important characteristic of the system is θ, the CO2 emissions per kWhr of electricity produced.

$$\vartheta_{cap} = \frac{(1-\zeta)(\gamma_{C,I} + \gamma_{C,PCC})}{P_I + P_{PCC}}$$

This is advantageously reduced from the reference level (i.e. when the separation reactor is turned off), namely $$\vartheta_{no\,cap} = \frac{\gamma_{C,I} + \gamma_{C,PCC}}{P_I + P_{PCC\,no\,cap}}$$

The combustion of fuel in the PCC reactor 160 preferably has little deleterious impact because the PCC reactor 160 compensates by increasing the power output. Because gas turbine systems generally have a higher thermal efficiency than a coal fired power plant, the overall thermal efficiency of the plant with PCC is advantageously increased in the example embodiment. The low energy loss of the Endex Configuration system is such that the PCC reactor overall boosts the power output and scrubs the CO2 from both the (external) industrial process to which the PCC reactor is applied, as well as from the exhaust of the combustor 106 in the PCC reactor 160.

Figure 2:
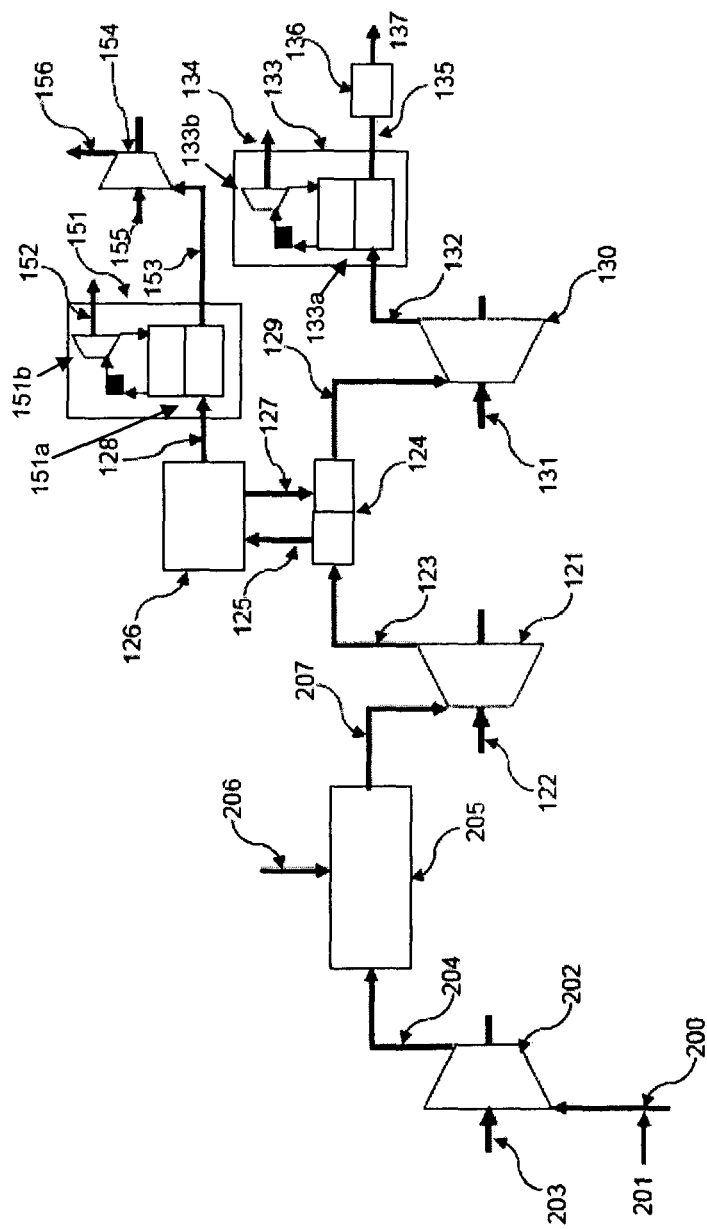
FIG. 2 shows a schematic drawing illustrating the process flow and reactor system for a PCC system according to a second example embodiment in which the combustion of fuel is used to internally heat the flue gas.

In a second embodiment shown in FIG. 2, the flue gas 200 from the industrial process plant (not shown) is mixed with air 201 and compressed in a compressor 202 with electrical power input 203 to give a compressed gas 204 which is heated in a heater unit in the form of an internal combustor 205 through the injection of a fuel 206 to give a hot compressed flue gas 207. The remainder of the system and process in this embodiment is as described in FIG. 1, and the same reference numerals have been used to indicate the same components/parts in FIG. 2. In this embodiment, the amount of air added is sufficient for complete combustion of the fuel 206 to occur in the presence of the industrial flue gas 200, which itself is a source of oxygen due to its incomplete combustion.

One advantage of this second example embodiment is that a simpler combustor 205 is used which can essentially be the same as that used in e.g. a conventional gas turbine power generator. On the other hand, the fuel 206 used is natural gas or a high grade syngas which is generally more expensive.

Figure 3:
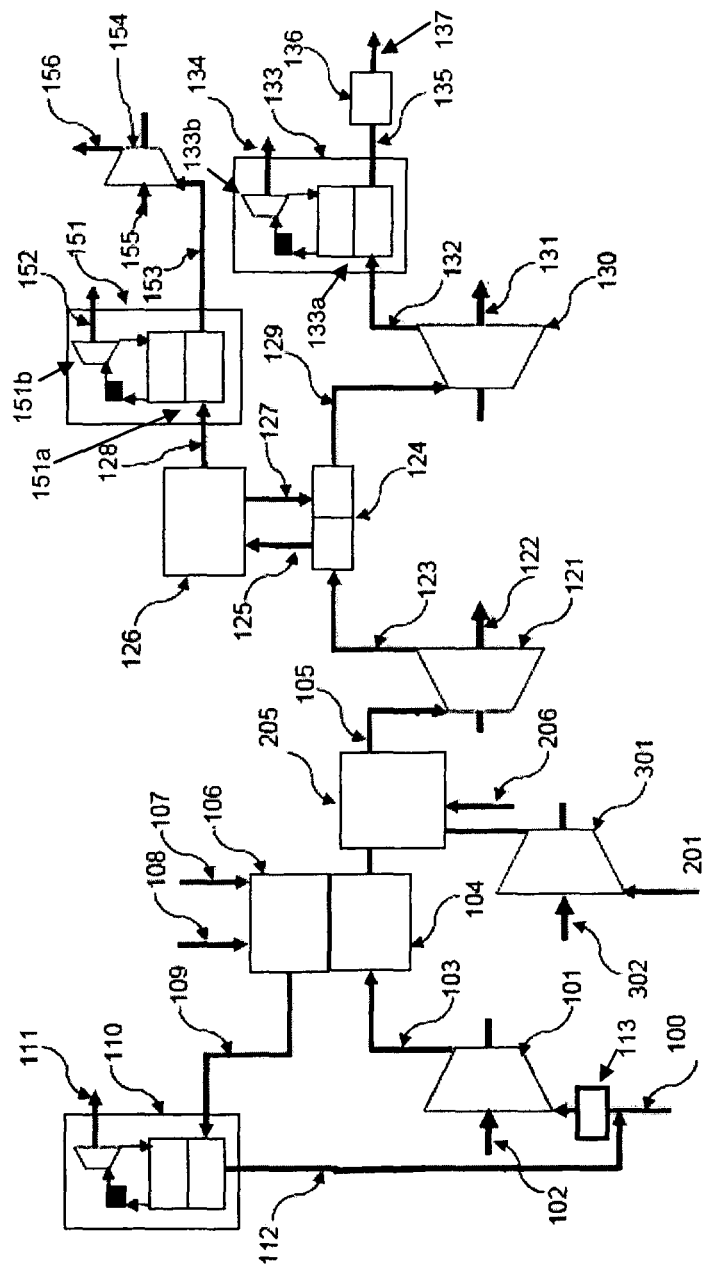
FIG. 3 shows a schematic drawing illustrating the process flow and reactor system for a PCC system according to a third example embodiment in which the combustion of one fuel is used to externally heat the flue gas to an intermediate temperature and another fuel is used to internally heat the flue gas to the desired temperature.

In a third embodiment shown in FIG. 3, a hybrid approach is used in which the initial stage of heating is accomplished by the external heating approach of the embodiment shown in FIG. 1 (compare item 104 in FIG. 3) and the internal heating approach of FIG. 2 (compare item 205 in FIG. 3). There is a minimum oxygen requirement for complete combustion of a fuel in a flue gas, and the system in FIG. 3 shows a separate air compressor 301 with a power input 302 and the two combustion streams are thus mixed after the internal combustion is complete. It is noted that the combustible gas required for the second stage can be extracted as the volatile compounds of most solid and liquid fuels that can be used in the first stage. The remainder of the system and process in this embodiment is as described in FIG. 1 and FIG. 2 and the same reference numerals have been used to indicate the same components/parts in FIG. 3.

Figure 4:
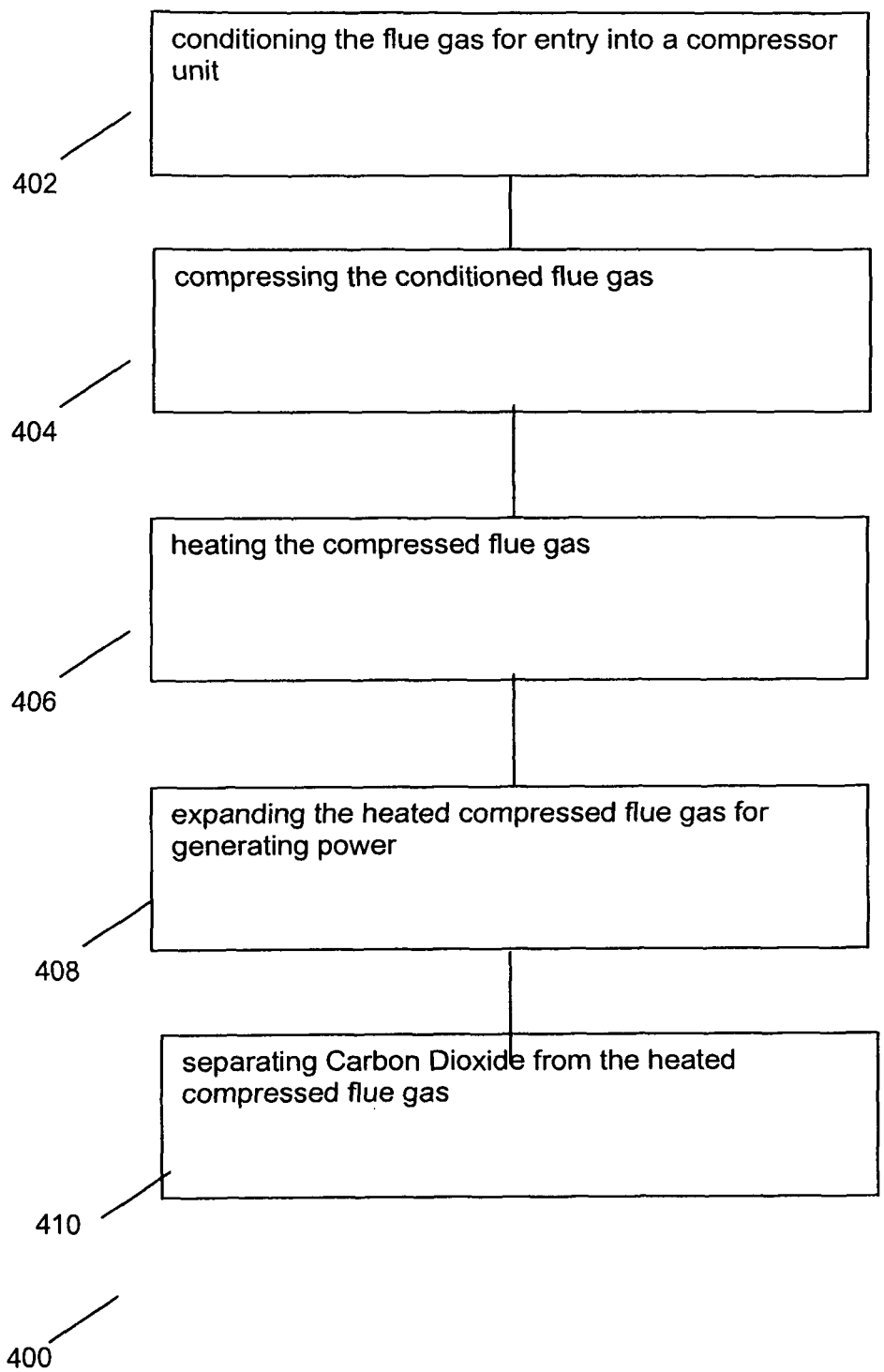
FIG. 4 shows a flow chart 400 illustrating a method for extracting carbon dioxide from an industrial source of flue gas at atmospheric pressure, according to an example embodiment.

FIG. 4 shows a flow chart 400 illustrating a method for extracting carbon dioxide from an industrial source of flue gas at atmospheric pressure, according to an example embodiment. At step 402, the flue gas is conditioned for entry into a compressor unit. At step 404 the conditioned flue gas is compressed. At step 406, the compressed flue gas is heated. At step 408, the heated compressed flue gas is expanded for generating power, and at step 410, Carbon Dioxide is separated from the heated compressed flue gas.

The example embodiments described provide a PCC separation and compression system using the Endex Configuration for CaO Looping. The PCC system in one embodiment comprises:

(a) a compressor to compress the industrial flue gas to a high pressure so that the electrical power generation efficiency is optimised;

(b) a combustor to heat the gas to the optimum temperature for generation of electrical power, e.g. about 1300 C, with flue gases from the combustor being injected into the gas stream for CO2 separation;

(c) a multistage turboexpander in which the desired temperature and pressure input for the CO2 Separator is reached at an intermediate stage, e.g. about 12-20 bar and about 790-810 C, depending on the CO2 partial pressure;

(d) heat recovery steam generators and steam turbines for the recovery of electrical power from hot gases, from cooling of the scrubbed gases for emission to the atmosphere, and from cooling of the CO2 stream for compression.

An atmospheric combustor may generate the heat which is transferred to the compressed industrial flue gas. One advantage of this approach is that atmospheric combustors have been developed for every type of fuel—from coal, oil, biomass and waste, as well as for natural gas and syngas. With the exception of natural gas, and for high grade syngas, the combustion of these fuels leads to high concentrations of top fly ash, SOx and mercury and other components that cause deterioration of high performance gas turbines unless they are removed prior to expansion.

In such embodiments, the combustion of the fuel occurs at near atmospheric pressure and the flue gas from this combustion is cooled and scrubbed before and/or after being mixed with the industrial flue gas prior to compression. However, the mechanical assembly for transferring heat from an atmospheric combustor to a high pressure gas at temperatures approaching 1300 C can be challenging, and an internal stage of heating using a gas fuel such as natural gas, or high quality syngas, or the volatile components of oil are used in an alternative embodiment to reach the desired operating temperature. In such embodiments, air may be injected with the industrial flue gas in the compressor and the fuel may be injected for combustion as in a gas turbine system.

In a hybrid system in another embodiment, to enable complete combustion of the fuel, a separate air compressor may be used and the gas streams can then be mixed after combustion of the fuel in the air is complete.

The CO2 separation is preferably matched to a pressure and temperature of the flue gas that can be achieved at an intermediate expansion stage of a turboexpander. Most turboexpanders are comprised of segments in which the gas is expanded adiabatically to a lower temperature and pressure. The first stage is a high performance stage in which the blades can e.g. operate at temperatures as a high as about 1350 C. and about 30 bar delivering an output at, say, about 800 C. and about 20 bar. The CO2 separation system can be deployed between the first and second stages (or generally between any pair of stages) in the example embodiments.

The separation system in the example embodiments typically introduces additional chemicals into the gas stream such as particulates of lime in the case of CaO Looping. The lower the temperature of the flue gas at the exhaust of the separation system, the more tolerant the downstream turboexpander will be to the chemicals and particulars. Ruggedised industrial turbines are understood in the art, and can be tolerant to particulates and corrosive chemicals. For example, turboexpanders used to generate power may operate with turbine inlet temperatures of 1350 C and higher, whereas ruggedised turbines can operate at temperatures below 1050 C, making them suitable in the range used in example embodiments. The preferred flue gas pressure required to enable the CO2 to be extracted with e.g. 90% efficiency depends on the separator system used. For example, the Endex Configuration operating with a CO2 exhaust pressure of about 0.2 bar has an input CO2 pressure of at least about 2.0 bar. If the CO2 partial pressure at the input is 15%, then the matching flue gas pressure for 90% capture would be at least 13.3 bar. The input temperature of the flue gas into this system is about 800 C. The separator system in an example embodiment benefits from the fine control of the input temperature, so that the flue gas input exceeds e.g. 800 C. This control can be supplied in such an example embodiment by e.g. a heat exchanger used to condition the input gas (compare 124 in FIG. 1).

Generally, there will be an energy penalty associated with the variable heat exchanger which scales with the temperature difference between the turboexpander segment exhaust and the input of the separator. High temperature solids looping approaches to carbon capture are preferred in the example embodiments, as they can advantageously operate at high temperature and high pressure. In a preferred embodiment, the Endex Configuration operates at high temperature so the difference is typically 0-25 C, whereas an aqueous solution process, such as the Benfield process [Richard K. Bartoo, "Removing asset gases by Benfield process", CEP, 1984, 35-39] might operate in the range of about 200-125 C, so that the temperature difference would be 625-700 C. That is, the selection of the CO2 separation process takes account of the matching of the temperature of the separator input and the turboexpander segment exhaust.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for extracting carbon dioxide from an industrial source of flue gas at atmospheric pressure, the system comprising:

means for conditioning the flue gas for entry into a compressor unit;

the compressor unit being adapted compressing the conditioned flue gas;

a heater unit for heating the compressed flue gas;

an expander unit for expanding the heated compressed flue gas for generating power; and a separator unit for separating Carbon Dioxide from the heated compressed flue gas.

2. The system as claimed in claim 1, wherein the expander unit comprises two more expander elements configured in an expander train, and the separator unit is disposed between successive ones of the expander elements.

3. The system as claimed in claim 1, wherein the heater unit comprises an atmospheric combustion element fueled by an fuel medium and air and a heat transfer unit for transferring heat from the atmospheric combustion element to at least a first portion of the compressed flue gas.

4. The system as claimed in claim 1, wherein the flue medium comprises a one or more of a group consisting of a solid, a liquid or a gas.

5. The system as claimed in claim 1, wherein the system further comprises means for providing an oxidant in at least a second portion of the compressed flue gas, and the heater unit comprises a high pressure combustor element adapted for injection of a fuel gas for internal combustion of a mixture of the second portion of the compressed flue gas and the fuel gas.

6. The system as claimed in claim 1, further comprising one or more heat recovery steam generators coupled to one or more steam turbines.

7. The system as claimed in claim 1, wherein the compressor unit is adapted to compress the conditioned flue gas at a pressure of 20-30 bar and the heater unit is adapted to heat the compressed flue gas to a temperature in the range of 1250-1350 C.

8. A method for extracting carbon dioxide from an industrial source of flue gas at atmospheric pressure, the method comprising the steps of:

conditioning the flue gas for entry into a compressor unit;

compressing the conditioned flue gas;

heating the compressed flue gas;

expanding the heated compressed flue gas for generating power; and separating Carbon Dioxide from the heated compressed flue gas.

9. The method as claimed in claim 8, wherein the expanding step utilizes two more expander elements configured in an expander train, and the separation step utilizes a separator unit disposed between successive ones of the expander elements.

10. The method as claimed in claim 8, wherein the heating step utilizes an atmospheric combustion element fueled by a fuel medium and air and a heat transfer unit for transferring heat from the atmospheric combustion element to at least a first portion of the compressed flue gas.

11. The method as claimed in claim 8, wherein the flue medium comprises a one or more of a group consisting of a solid, a liquid or a gas.

12. The method as claimed in claim 8, wherein the method further comprises providing an oxidant in at least a second portion of the compressed flue gas, and injecting of a fuel gas for internal combustion of a mixture of the second portion of the compressed flue gas and the fuel gas.

13. The method as claimed in claim 8, further comprising generating energy utilizing one or more recovery steam generators coupled to one or more steam turbines.

14. The method as claimed in claim 8, wherein the compressing step compresses the conditioned flue gas to a pressure of 20-30 bar and the heating step heats the compressed flue gas to a temperature in the range of 1250-1350 C.

* * * * *